US011908116B2

United States Patent
Lee et al.

(10) Patent No.: US 11,908,116 B2
(45) Date of Patent: Feb. 20, 2024

(54) SCALED PSNR FOR IMAGE QUALITY ASSESSMENT

(71) Applicant: SONY GROUP CORPORATION, Tokyo (JP)

(72) Inventors: Jong Hwa Lee, San Diego, CA (US); Praggya Garg, San Diego, CA (US)

(73) Assignee: SONY GROUP CORPORATION, Tokyo (JP)

( * ) Notice: Subject to any disclaimer, the term of this patent is extended or adjusted under 35 U.S.C. 154(b) by 137 days.

(21) Appl. No.: 17/222,645

(22) Filed: Apr. 5, 2021

(65) Prior Publication Data

US 2022/0051384 A1 Feb. 17, 2022

Related U.S. Application Data

(60) Provisional application No. 63/064,276, filed on Aug. 11, 2020.

(51) Int. Cl.
  *G06T 7/00* (2017.01)
  *G06V 10/75* (2022.01)

(52) U.S. Cl.
  CPC .......... *G06T 7/0002* (2013.01); *G06V 10/751* (2022.01); *G06T 2207/30168* (2013.01)

(58) Field of Classification Search
  CPC ........ G06T 7/0002; G06T 2207/30168; G06V 10/751
  See application file for complete search history.

(56) References Cited

U.S. PATENT DOCUMENTS

| 8,983,206 B2 | 3/2015 | Coulombe et al. |
| 10,165,218 B2 | 12/2018 | Fernandes et al. |
| 10,277,914 B2 | 4/2019 | Makar et al. |
| 2009/0010341 A1* | 1/2009 | Pan ........................ H04N 19/61 382/199 |
| 2009/0097546 A1* | 4/2009 | Lee ........................ H04N 19/17 375/E7.154 |
| 2014/0240522 A1* | 8/2014 | Lee ....................... H04N 17/004 348/192 |

(Continued)

OTHER PUBLICATIONS

J. Erfurt, C. R. Helmrich, S. Bosse, H. Schwarz, D. Marpe and T. Wiegand, "A Study of the Perceptually Weighted Peak Signal-To-Noise Ratio (WPSNR) for Image Compression," 2019 IEEE International Conference on Image Processing (ICIP), 2019, pp. 2339-2343, doi: 10.1109/ICIP.2019.8803307. (Year: 2019).*

(Continued)

*Primary Examiner* — Ian L Lemieux
(74) *Attorney, Agent, or Firm* — Haverstock & Owens, A Law Corporation (57) ABSTRACT

The scaled Peak Signal-to-Noise Ratio (PSNR) method scales PSNR to 1.00 or 100% from infinite decibel values. The PSNR describes the ratio between the maximum possible value (power) of a signal and the power of signal's noise. Noise affects the quality of its representation. Signals dynamically fluctuate from the smallest to largest possible quantity. The unsettled range to maximum from minimum values of the noise is unknown. Therefore, the PSNR usually forms on a logarithmic way (log) of describing a ratio, the decibel (dB). The dB is able to gauge the level of power, communication signal (intensity or voltage), sound pressure, and intensity of several other items including images.

12 Claims, 5 Drawing Sheets

(56) References Cited

U.S. PATENT DOCUMENTS

2019/0320186 A1* 10/2019 Liu ................... H04N 19/186
2020/0389588 A1* 12/2020 Sharma ............. H04N 5/23229

OTHER PUBLICATIONS

M. Xu, C. Li, S. Zhang and P. L. Callet, "State-of-the-Art in 360° Video/Image Processing: Perception, Assessment and Compression," in IEEE Journal of Selected Topics in Signal Processing, vol. 14, No. 1, pp. 5-26, Jan. 2020, doi: 10.1109/JSTSP.2020.2966864.

* cited by examiner

Original image

Noise variance=0.1
sPSNR=67.0498%

Fig. 3

Original image

Noise variance=0.1
sPSNR=77.0530%

SCALED PSNR FOR IMAGE QUALITY ASSESSMENT

CROSS-REFERENCE TO RELATED APPLICATION(S)

This application claims priority under 35 U.S.C. § 119(e) of the U.S. Provisional Patent Application Ser. No. 63/064,276, filed Aug. 11, 2020 and titled, "SCALED PSNR FOR IMAGE QUALITY ASSESSMENT," which is hereby incorporated by reference in its entirety for all purposes.

FIELD OF THE INVENTION

The present invention relates to image analysis. More specifically, the present invention relates to image quality assessment.

BACKGROUND OF THE INVENTION

Computer vision involves artificial intelligence trained to understand the visual world. Images and videos are used to train learning models so that machines are able to accurately identify and classify objects.

SUMMARY OF THE INVENTION

The scaled Peak Signal-to-Noise Ratio (PSNR) method scales PSNR to 1.00 or 100% from infinite decibel values. The PSNR describes the ratio between the maximum possible value (power) of a signal and the power of signal's noise. Noise affects the quality of its representation. Signals dynamically fluctuate from the smallest to largest possible quantity. The unsettled range to maximum from minimum values of the noise is unknown. Therefore, the PSNR usually forms on a logarithmic way (log) of describing a ratio, the decibel (dB). The dB is able to gauge the level of power, communication signal (intensity or voltage), sound pressure, and intensity of several other items including images.

In one aspect, a method comprises acquiring a first image and a second image and comparing the first image and the second image using a scaled Peak Signal-to-Noise Ratio (sPSNR) to generate an image quality assessment value. The sPSNR is based on a scale factor, a maximum possible pixel value and a mean squared error. The sPSNR is based on the equation:

$$sPSNR = 10\log\left(\frac{c_0 \text{MAX}^4}{1 + MSE}\right).$$

The image quality assessment value comprises a percentage value between 0% and 100%, inclusive. The method further comprises comparing the image quality assessment value with a threshold to determine whether the first image and the second image match. The threshold is generated by a user and/or machine learning. The sPSNR is utilized for computer vision.

In another aspect, an apparatus comprises a non-transitory memory for storing an application, the application for: acquiring a first image and a second image and comparing the first image and the second image using a scaled Peak Signal-to-Noise Ratio (sPSNR) to generate an image quality assessment value and a processor coupled to the memory, the processor configured for processing the application. The sPSNR is based on a scale factor, a maximum possible pixel value and a mean squared error. The sPSNR is based on the equation:

$$sPSNR = 10\log\left(\frac{c_0 \text{MAX}^4}{1 + MSE}\right).$$

The image quality assessment value comprises a percentage value between 0% and 100%, inclusive. The apparatus further comprises comparing the image quality assessment value with a threshold to determine whether the first image and the second image match. The threshold is generated by a user and/or machine learning. The sPSNR is utilized for computer vision.

In another aspect, a system comprises a first device configured for acquiring a first image and a second image and a second device configured for comparing the first image and the second image using a scaled Peak Signal-to-Noise Ratio (sPSNR) to generate an image quality assessment value. The sPSNR is based on a scale factor, a maximum possible pixel value and a mean squared error. The sPSNR is based on the equation:

$$sPSNR = 10\log\left(\frac{c_0 \text{MAX}^4}{1 + MSE}\right).$$

The image quality assessment value comprises a percentage value between 0% and 100%, inclusive. The system further comprises comparing the image quality assessment value with a threshold to determine whether the first image and the second image match. The threshold is generated by a user and/or machine learning. The sPSNR is utilized for computer vision.

DETAILED DESCRIPTION OF THE PREFERRED EMBODIMENT

In general, Image Quality Assessment (IQA) methods include subjective methods based on humans' perceptions (e.g., how realistic the image looks) and objective computational methods. The humans' perception is often time-consuming and expensive. Thus, objective computational methods are currently mainstream.

Peak Signal-to-Noise Ratio (PSNR) is one of the most popular implementations for IQA. The PSNR is currently expressed in terms of the logarithmic decibel scale. Therefore, it is not easy to learn its quality intuitively; dB ranged to infinite.

The scaled PSNR method described herein expresses decibel quality ranging from 0% to 100% (or 0 to 1.00). Therefore, it is easy to understand its level of quality. Moreover, because of scaling 0 to 1.00, the scaled PSNR method is able to be combined with other computational IQA approaches such as the Structural Similarity Index (SSIM). SSIM is proposed for measuring the structural similarity between images, based on independent comparisons in terms of luminance, contrast and structures.

The scaled PSNR method scales PSNR to 1.00 or 100% from infinite decibel values. The PSNR describes the ratio between the maximum possible value (power) of a signal, and the power of signal's noise. Noise affects the quality of its representation. Signals dynamically fluctuate from the smallest to largest possible quantity. In general, the unsettled range to maximum from minimum values is unknown. Therefore, the PSNR usually forms on a logarithmic way (log) of describing a ratio, the decibel (dB). The dB can gauge the level of power, communication signal (intensity or voltage), sound pressure, and intensity of several other things including images.

Machine learning is able to be used to generate an image. PSNR is a commonly used objective metric to measure the reconstruction quality of an image. PSNR is inversely proportional to the logarithm of the Mean Squared Error (MSE) between ground truth (reference) image and the generated (test) image.

The PSNR is defined as:

$$PSNR = 10\log\left(\frac{MAX^2}{MSE}\right)$$

where MAX is the maximum possible pixel value of the image. When the pixels are represented using 8 bits per sample, the MAX is 255. MSE is:

$$MSE = \frac{1}{mn}\sum_{0}^{m-1}\sum_{0}^{n-1}\|f(i,j) - g(i,j)\|^2$$

m and n represent resolution of image, e.g., 4K (3840×2160 pixels) image has m=3840 and n=2160. The f(i,j) and g(i,j) are the reference and test images, respectively.

The bel is defined mathematically as LB=log 10 (P1/P0) where P1 and P0 are two quantities that are in the same units of measure. The decibel is 0.1 bel, so the decibel value LdB is LdB=10 log 10 (P1/P0). The noise level between two signal sources is unknown, while its level between two images is known: maximum is 255, and minimum is 0. This is because each pixel value ranges 0 to 255 in digital imaging using 8-bit representations.

For image quality assessment, the scaled PSNR (sPSNR) is as follows:

$$sPSNR = 10\log\left(\frac{c_0 MAX^4}{1 + MSE}\right).$$

The unit is percentage (%), and log means log 10. An sPSNR value of 100% implies no pixel error between the test image and the reference image, in other words, they are identical images. A sPSNR value of 0% indicates complete noise or no match. As described above, the MAX is the maximum signal value that exists in the pixel (255), $c_0$ is a scale factor (2.3650) and MSE is defined by the equation above.

As described previously, existing IQA such as PSNR has a dB unit. Therefore, PSNR indicates its quality as dB from negative infinity to positive infinity. In the existing IQA, it is not easy to determine if 25 dB is good quality or bad quality. The sPSNR scales negative infinity and positive infinity dB to 0% to 100% so that a known image level is obtained, and quality reconstruction is possible from Generative Adversarial Networks (GAN) or other methods.

Figure 1:
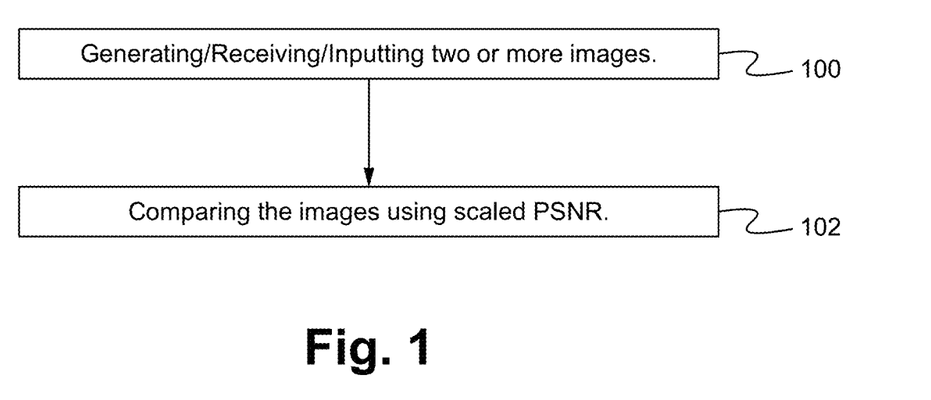
FIG. 1 illustrates a flowchart of a scaled PSNR method according to some embodiments.

FIG. 1 illustrates a flowchart of a scaled PSNR method according to some embodiments. In the step 100, two or more images are generated/received/input. For example, the images are able to be generated using computer-generated programming In another example, an image is acquired, and then a computer-generated image is generated from the acquired image. In the step 102, the images are compared using scaled PSNR (sPSNR). As described in the equations above, the PSNR of two images is found using the MAX and MSE, where the MSE includes summations using the two images. Unlike PSNR, the sPSNR is found using an equation involving log, MAX, MSE and a scale factor. The sPSNR is the comparison result. A result of 1.00 or 100% indicates that there are no errors. A result of 0.00 or 0% indicates maximum error. For example, two images are able to be compared using the scaled PSNR method to determine how similar the images are. In some embodiments, fewer or additional steps are implemented. For example, the comparison result is used in computer vision such as for machine learning. Furthering the example, two images are compared, and if the comparison result is above a threshold (e.g., 80%), then the images are considered a match, but if the images are not above the threshold, then the images are not considered a match. The threshold is able to be generated by a user and/or using machine learning (e.g., artificial intelligence). Similarly, the sPSNR is able to determine if a level of quality of an image is acceptable (e.g., above a threshold). In some embodiments, the order of the steps is modified.

Figure 2:
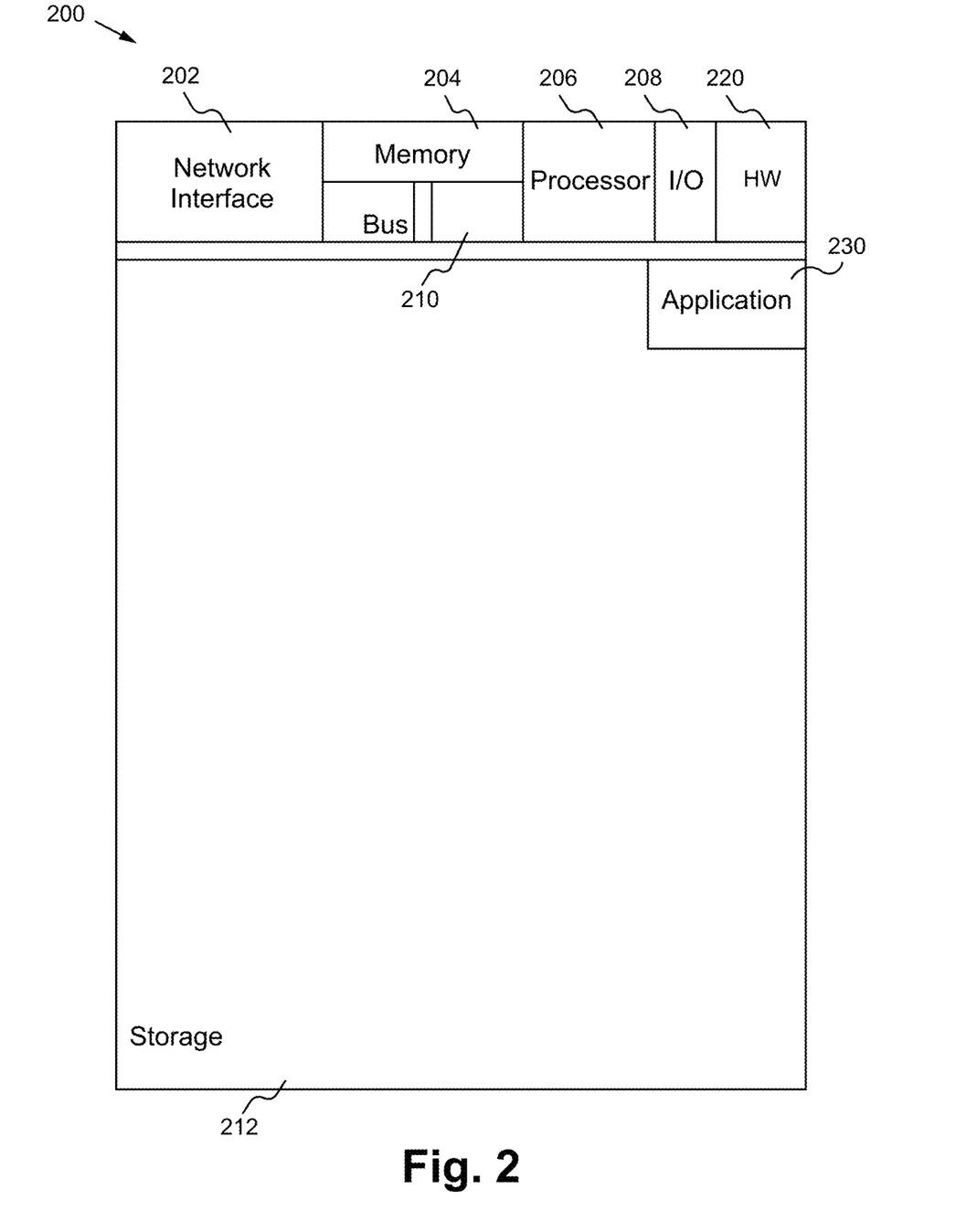
FIG. 2 illustrates a block diagram of an exemplary computing device configured to implement a scaled PSNR method according to some embodiments.

FIG. 2 illustrates a block diagram of an exemplary computing device configured to implement a scaled PSNR method according to some embodiments. The computing device 200 is able to be used to acquire, store, compute, process, communicate and/or display information such as images and videos. The computing device 200 is able to implement any of the scaled PSNR method aspects. In general, a hardware structure suitable for implementing the computing device 200 includes a network interface 202, a memory 204, a processor 206, I/O device(s) 208, a bus 210 and a storage device 212. The choice of processor is not critical as long as a suitable processor with sufficient speed is chosen. The memory 204 is able to be any conventional computer memory known in the art. The storage device 212 is able to include a hard drive, CDROM, CDRW, DVD, DVR, High Definition disc/drive, ultra-HD drive, flash memory card or any other storage device. The computing device 200 is able to include one or more network interfaces 202. An example of a network interface includes a network card connected to an Ethernet or other type of LAN. The I/O device(s) 208 are able to include one or more of the following: keyboard, mouse, monitor, screen, printer, modem, touchscreen, button interface and other devices. Scaled PSNR application(s) 230 used to implement the scaled PSNR method are likely to be stored in the storage device 212 and memory 204 and processed as applications are typically processed. More or fewer components shown in FIG. 2 are able to be included in the computing device 200. In some embodiments, scaled PSNR hardware 220 is included. Although the computing device 200 in FIG. 2 includes applications 230 and hardware 220 for the scaled PSNR method, the scaled PSNR method is able to be implemented on a computing device in hardware, firmware, software or any combination thereof. For example, in some embodiments, the scaled PSNR applications 230 are programmed in a memory and executed using a processor. In another example, in some embodiments, the scaled PSNR hardware 220 is programmed hardware logic including gates specifically designed to implement the scaled PSNR method.

In some embodiments, the scaled PSNR application(s) 230 include several applications and/or modules. In some embodiments, modules include one or more sub-modules as well. In some embodiments, fewer or additional modules are able to be included.

Examples of suitable computing devices include a microscope, a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, an augmented reality device, a virtual reality device, smart jewelry (e.g., smart watch), a vehicle (e.g., a self-driving vehicle) or any other suitable computing device.

Figure 3:
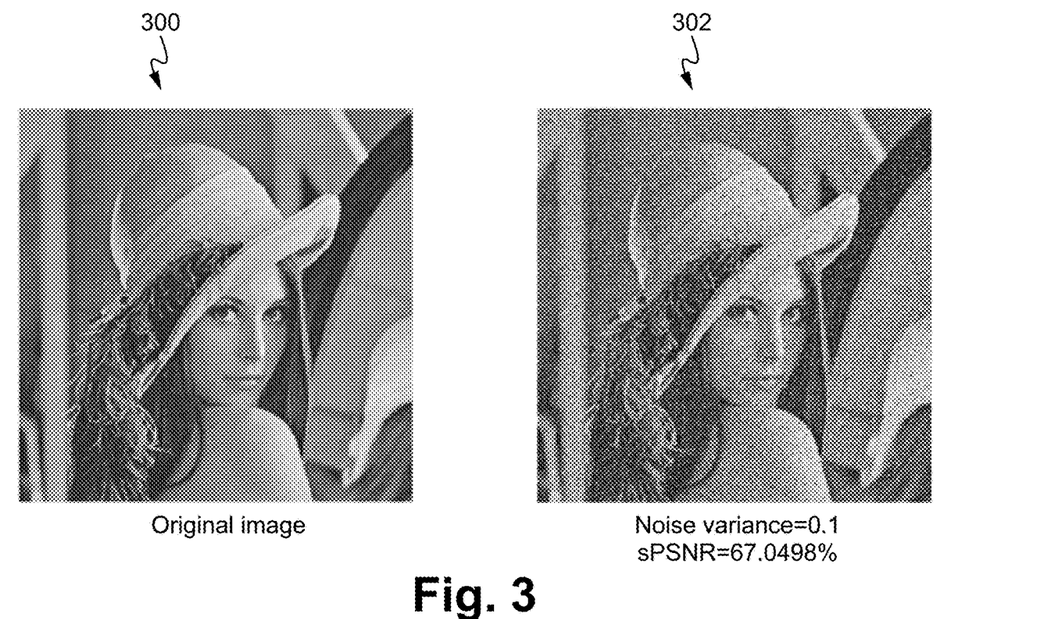
FIG. 3 illustrates exemplary image tests according to some embodiments.

FIG. 3 illustrates exemplary image tests according to some embodiments. As shown, there is an original image 300 and a noisy image 302 for comparison. With a noise variance of 0.1, the sPSNR is 67.0498%.

Figure 4:
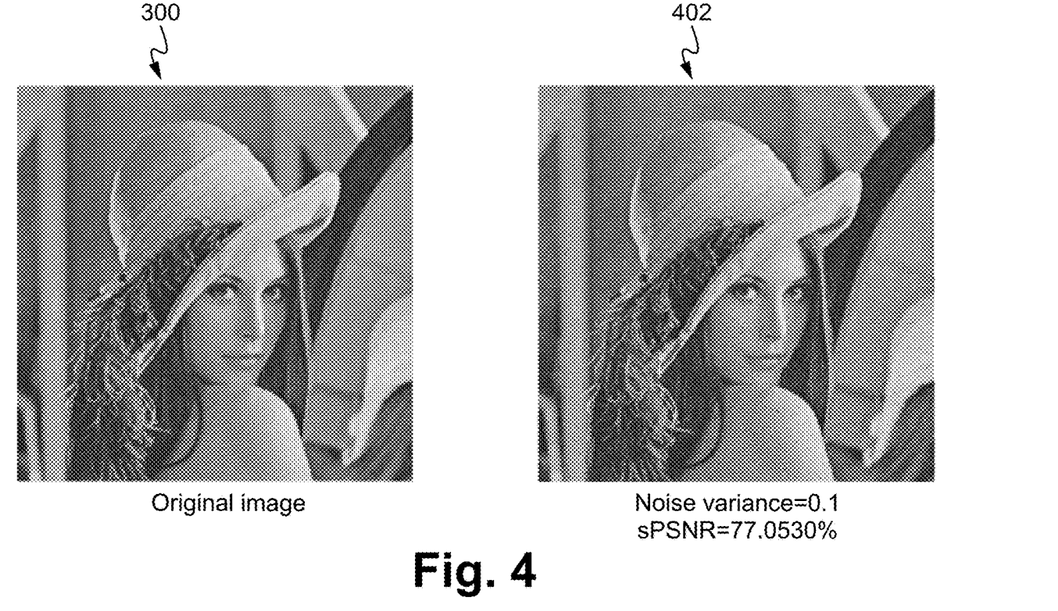
FIG. 4 illustrates exemplary image tests according to some embodiments.

FIG. 4 illustrates exemplary image tests according to some embodiments. As shown, there is an original image 300 and a noisy image 402 for comparison. With a noise variance of 0.01, the sPSNR is 77.0530%.

Figure 5:
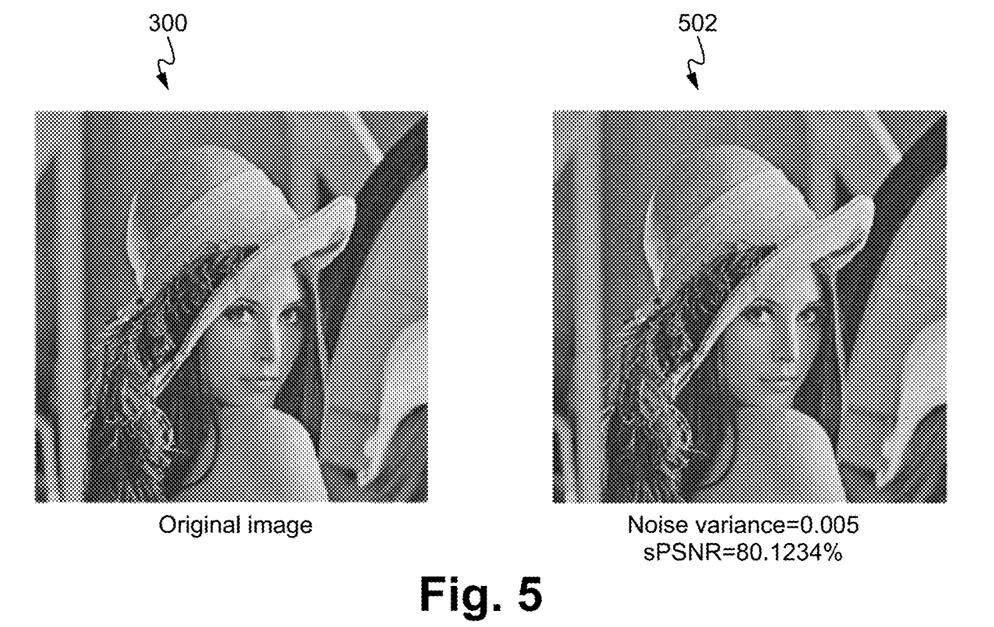
FIG. 5 illustrates exemplary image tests according to some embodiments.

FIG. 5 illustrates exemplary image tests according to some embodiments. As shown, there is an original image 300 and a noisy image 502 for comparison. With a noise variance of 0.005, the sPSNR is 80.1234%.

Figure 6:
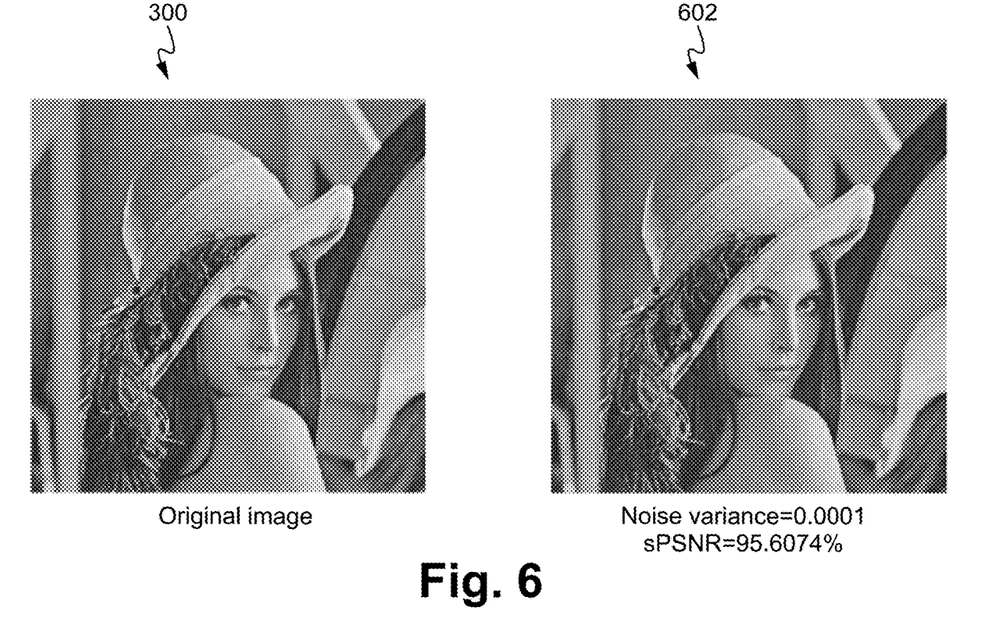
FIG. 6 illustrates exemplary image tests according to some embodiments.

FIG. 6 illustrates exemplary image tests according to some embodiments. As shown, there is an original image 300 and a noisy image 602 for comparison. With a noise variance of 0.0001, the sPSNR is 95.6074%.

Figure 7:
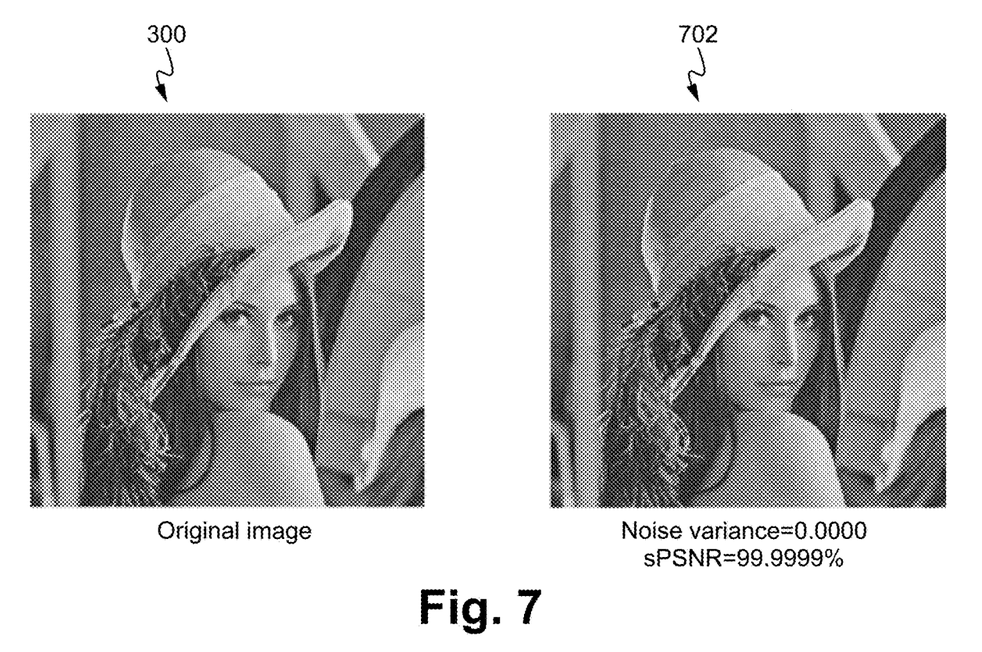
FIG. 7 illustrates exemplary image tests according to some embodiments.

FIG. 7 illustrates exemplary image tests according to some embodiments. As shown, there is an original image 300 and a barely noisy image 702 for comparison. With a noise variance of 0, the sPSNR is 99.9999%.

As is shown, the noise in the noisy image 302 is much higher than the noise in the subsequent noisy images. As a result, the sPSNR goes up as the noise goes down.

To utilize the scaled PSNR method described herein, devices such as a camera are used to acquire content, and a device is able to process the acquired content. The scaled PSNR method is able to be implemented with user assistance or automatically without user involvement. The scaled PSNR method is able to be incorporated with any computer vision system such as on an autonomous vehicle.

In operation, the scaled PSNR method enables a more precise comparison of images such that each comparison result is able to be compared with other comparison results. The scaled PSNR method improves a computing device's ability to implement machine learning and performing image comparison analysis.

SOME EMBODIMENTS OF SCALED PSNR FOR IMAGE QUALITY ASSESSMENT

1. A method comprising:
   acquiring a first image and a second image; and
   comparing the first image and the second image using a scaled Peak Signal-to-Noise Ratio (sPSNR) to generate an image quality assessment value.
2. The method of clause 1 wherein the sPSNR is based on a scale factor, a maximum possible pixel value and a mean squared error.
3. The method of clause 1 wherein the sPSNR is based on the equation:

$$sPSNR = 10\log\left(\frac{c_0 \text{MAX}^4}{1 + MSE}\right).$$

4. The method of clause 1 wherein the image quality assessment value comprises a percentage value between 0% and 100%, inclusive.
5. The method of clause 1 further comprising comparing the image quality assessment value with a threshold to determine whether the first image and the second image match.
6. The method of clause 5 wherein the threshold is generated by a user and/or machine learning.
7. The method of clause 1 wherein the sPSNR is utilized for computer vision.
8. An apparatus comprising:
   a non-transitory memory for storing an application, the application for:
   acquiring a first image and a second image; and
   comparing the first image and the second image using a scaled Peak Signal-to-Noise Ratio (sPSNR) to generate an image quality assessment value; and
   a processor coupled to the memory, the processor configured for processing the application.
9. The apparatus of clause 8 wherein the sPSNR is based on a scale factor, a maximum possible pixel value and a mean squared error.
10. The apparatus of clause 8 wherein the sPSNR is based on the equation:

$$sPSNR = 10\log\left(\frac{c_0 \text{MAX}^4}{1 + MSE}\right).$$

11. The apparatus of clause 8 wherein the image quality assessment value comprises a percentage value between 0% and 100%, inclusive.
12. The apparatus of clause 8 further comprising comparing the image quality assessment value with a threshold to determine whether the first image and the second image match.
13. The apparatus of clause 12 wherein the threshold is generated by a user and/or machine learning.
14. The apparatus of clause 8 wherein the sPSNR is utilized for computer vision.

15. A system comprising:
    a first device configured for acquiring a first image and a second image; and
    a second device configured for comparing the first image and the second image using a scaled Peak Signal-to-Noise Ratio (sPSNR) to generate an image quality assessment value.
16. The system of clause 15 wherein the sPSNR is based on a scale factor, a maximum possible pixel value and a mean squared error.
17. The system of clause 15 wherein the sPSNR is based on the equation:

$$sPSNR = 10\log\left(\frac{c_0 MAX^4}{1 + MSE}\right).$$

18. The system of clause 15 wherein the image quality assessment value comprises a percentage value between 0% and 100%, inclusive.
19. The system of clause 15 further comprising comparing the image quality assessment value with a threshold to determine whether the first image and the second image match.
20. The system of clause 19 wherein the threshold is generated by a user and/or machine learning.
21. The system of clause 15 wherein the sPSNR is utilized for computer vision.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method programmed in a non-transitory memory of a device, the method comprising:
    acquiring a first image and a second image;
    comparing the first image and the second image using a scaled Peak Signal-to-Noise Ratio (sPSNR) to generate an image quality assessment value;
    comparing the image quality assessment value with a threshold, wherein the sPSNR is utilized for computer vision for machine learning, wherein the sPSNR is based on the equation:

$$sPSNR = 10\log\left(\frac{c_0 MAX^4}{1 + MSE}\right).$$

wherein $c_0$ is a scale factor, MAX is a maximum possible pixel value, and MSE is a mean squared error;
    comparing luminance, contrast and one or more structures in the first image and the second image to generate a structural similarity index; and
    combining the sPSNR and the structural similarity index to determine whether the first image and the second image match.

2. The method of claim 1 wherein the sPSNR is based on a scale factor, a maximum possible pixel value and a mean squared error.

3. The method of claim 1 wherein the image quality assessment value comprises a percentage value between 0% and 100%, inclusive.

4. The method of claim 1 wherein the threshold is generated by a user and/or machine learning.

5. An apparatus comprising:
    a non-transitory memory for storing an application, the application for:
        acquiring a first image and a second image;
        comparing the first image and the second image using a scaled Peak Signal-to-Noise Ratio (sPSNR) to generate an image quality assessment value;
        comparing the image quality assessment value with a threshold, wherein the sPSNR is utilized for computer vision for machine learning, wherein the sPSNR is based on the equation:

$$sPSNR = 10\log\left(\frac{c_0 MAX^4}{1 + MSE}\right).$$

wherein $c_0$ is a scale factor, MAX is a maximum possible pixel value, and MSE is a mean squared error;
        comparing luminance, contrast and one or more structures in the first image and the second image to generate a structural similarity index; and
        combining the sPSNR and the structural similarity index to determine whether the first image and the second image match; and
    a processor coupled to the memory, the processor configured for processing the application.

6. The apparatus of claim 5 wherein the sPSNR is based on a scale factor, a maximum possible pixel value and a mean squared error.

7. The apparatus of claim 5 wherein the image quality assessment value comprises a percentage value between 0% and 100%, inclusive.

8. The apparatus of claim 5 wherein the threshold is generated by a user and/or machine learning.

9. A system comprising:
    a first device configured for acquiring a first image and a second image; and
    a second device comprising a non-transitory memory for storing an application, the application configured for:
        comparing the first image and the second image using a scaled Peak Signal-to-Noise Ratio (sPSNR) to generate an image quality assessment value;
        comparing the image quality assessment value with a threshold, wherein the sPSNR is utilized for computer vision for machine learning, wherein the sPSNR is based on the equation:

$$sPSNR = 10\log\left(\frac{c_0 MAX^4}{1 + MSE}\right).$$

wherein $c_0$ is a scale factor, MAX is a maximum possible pixel value, and MSE is a mean squared error;
        comparing luminance, contrast and one or more structures in the first image and the second image to generate a structural similarity index; and
        combining the sPSNR and the structural similarity index to determine whether the first image and the second image match.

10. The system of claim 9 wherein the sPSNR is based on a scale factor, a maximum possible pixel value and a mean squared error.

11. The system of claim 9 wherein the image quality assessment value comprises a percentage value between 0% and 100%, inclusive.

12. The system of claim 9 wherein the threshold is generated by a user and/or machine learning.

* * * * *